UNITED STATES PATENT OFFICE.

WILHELM BECKMANN, OF MUNICH, GERMANY.

COLORS.

SPECIFICATION forming part of Letters Patent No. 545,046, dated August 27, 1895.

Application filed September 28, 1894. Serial No. 524,321. (No specimens.)

*To all whom it may concern:*

Be it known that I, WILHELM BECKMANN, a citizen of Germany, residing in Munich, Bavaria, Germany, have invented certain new and useful Improvements in Colors or Paints, of which the following is a specification.

This invention relates to a method of producing water colors or paints which, on the one hand, have the advantages of oil-colors with respect to their practical application in painting, luminosity, and depth, combined with the advantages appertaining to water colors, and, on the other hand, as compared with the tempering-colors, show more brilliantly and do not change in any way when varnished. Moreover, these colors can be preserved longer than the ordinary egg-tempering colors on account of the durability of their binding material.

The method of producing the colors is the following: A binding material is used which consists, essentially, of a mixture of water, gum-arabic, and boiled linseed-oil, with the addition of unboiled linseed-oil. To this mixture are added glycerine, wax, tallow, and green soap in proper proportions. The whole is then boiled into a thin fluid mass while being constantly stirred and the boiling continued until a perfectly homogeneous mixture is produced. The proportions of the ingredients of this binding material are preferably chosen as follows: Water, six hundred to eight hundred parts, by weight; gum-arabic, six hundred and fifty to eight hundred parts, by weight; linseed-oil, four hundred to five hundred parts, by weight; glycerine, two hundred to three hundred parts, by weight; wax, fifteen to twenty-five parts, by weight; tallow, thirty to forty-five parts, by weight; green soap, thirty to sixty parts, by weight.

A mixture of water, gum-arabic, and linseed-oil without the above-named additional ingredients would lead to several imperfections. Above all, the mixture would dry too rapidly, to prevent which glycerine is added, thereby producing a slower drying of the binding material, and therefore of the colors. Moreover, the binding material, even with the addition of the glycerine, when dry, would be too brittle. Cracks and fissures would soon show, so that the pictures would soon show signs of deterioration, and to decrease this evil tallow combined with wax is added, which latter, moreover, gives a certain elasticity to the mass, which proves to be very advantageous in painting with colors prepared with this binding material. The addition of soap, finally, plays a very important part. It contributes largely toward the easy combining and union of the different ingredients of the binding material during the boiling of the same and renders it very pliable, so that it is readily applied with the brush. Without the addition of soap, the colors prepared with this binding material would draw out under the brush, which would be very annoying while painting. The green soap which I preferably employ is a soft potash soap or a potash and soda soft soap.

The above-named mixture constitutes the binding material for the colors. The latter are added in a ground form and in quantities proportional to the desired intensities to the mixture after it has become cold, are then intimately mixed therewith in a suitable manner, and are then filled into tubes or similar holders. For the purpose of giving the mixture a pleasant aroma, a few drops of gaultheria-oil or other suitable fluid may be added.

The water-colors thus produced have the following advantages over those hitherto produced:

First. They excel the oil-colors in power, depth, and freshness, without, however, becoming glazed.

Second. They are so prepared that they may be applied wet upon wet, and again wet upon dry, if necessary, the same as with oil-colors, without, in the former case, becoming paler when dry, as is the case with the ordinary water colors.

Third. Pastel-work can be done with them as well as with oil-colors. They can even be applied with a pallet-knife to the picture, which has been hitherto impossible with water-colors, and here, too, they are very durable.

Fourth. The painting technique is exactly the same as with oil-colors or pastel. One color upon another is applied without the danger of a change in color. The colors dry hard in the space of one-half to three-quarters of an hour, so that as soon as dry the artist can repaint, or, if necessary, varnish the picture at once.

Fifth. A picture painted with these colors cannot be distinguished from an oil-painting, and has the advantage that it does not darken with age like the latter.

Sixth. A further advantage is that pictures painted with these colors do not fade, as is the case with oil-paintings—i. e., that certain shades of color, or also the whole picture, do not assume a dry dimness; but, on the contrary, assume a fine, luscious, and enduring mellow luster, which increases the luminosity of the colors considerably, and which is very important for the artist.

Seventh. That, contrary to the case of many oil-colors, they do not become spotted or run— i. e., do not form for a long time a sticky skin which will not dry, and therefore cannot be painted over. These new colors, on the contrary, dry surely and securely.

Eighth. That with these colors any ground can be painted upon—for example, upon silk, wood, stone, paper, canvas, &c.,—the colors holding so securely that when dry they can scarcely be removed with the pallet-knife; and one can paint upon raw canvas without a chalk ground, it being only necessary to soak the canvas with milk.

Ninth. These colors are much more pliable than oil-colors, and on bending or rolling the painting they do not become loose or break off.

Tenth. Finally, these colors possess the same durability and unchangeability in the tubes as do the oil-colors. They do not dry up in the same and are not subject to chemical changes.

Eleventh. In contrast to the tempering-colors they are more brilliant and do not change on being varnished, as do the latter.

Twelfth. They are much more durable than the egg-tempering colors, which, as is well known, on account of their unstable binding material, must be applied immediately, as they spoil in a short time, on account of egg contained therein.

What I claim, and desire to secure by Letters Patent, is—

1. The process of making water colors or paints, which consists in adding to a binding material consisting of a mixture of water, gum arabic and linseed oil, glycerine, wax, tallow and green soap, and then boiling the same until it becomes a thin fluid mixture, and finally, after cooling, mixing the same with colors.

2. The process of making colors or paints, which consists in first mixing together water, adhesive material, oil, glycerine, wax, tallow and green soap, then boiling the mixture, and finally adding the colors after the mixture has cooled, substantially as set forth.

3. A paint comprising water, adhesive material, oil, glycerine, wax, tallow and green soap, in combination with coloring material, substantially as set forth.

In testimony that I claim the foregoing as my invention I have signed my name in presence of two subscribing witnesses.

WILHELM BECKMANN.

Witnesses:
BERNHARD GUDDEN,
EMIL HENZEL.